United States Patent [19]

Samen

[11] Patent Number: 4,978,948
[45] Date of Patent: Dec. 18, 1990

[54] COMBINED EARTHQUAKE SENSOR AND NIGHT LIGHT

[76] Inventor: Lynda S. Samen, 73.373 C.C. Dr., Ste. 704, Palm Desert, Calif. 92260

[21] Appl. No.: 492,467

[22] Filed: Mar. 13, 1990

[51] Int. Cl.⁵ .................... G08B 21/00; F21V 33/00
[52] U.S. Cl. ................................ 340/690; 340/321; 362/253; 362/806
[58] Field of Search ............. 340/690, 669, 689, 321; 362/253, 806, 810–811; 73/652; 33/366, 365

[56] References Cited

U.S. PATENT DOCUMENTS

| | | |
|---|---|---|
| D. 16,350 | 10/1985 | Jenkins . |
| 2,972,739 | 2/1961 | Opper .................................. 340/321 |
| 3,166,973 | 1/1965 | Healey . |
| 3,746,852 | 7/1973 | Beaudin . |
| 3,774,314 | 11/1973 | Youngs ............................. 33/365 X |
| 3,848,750 | 11/1974 | Hoge ................................. 340/689 X |
| 4,072,855 | 2/1978 | Marchese ......................... 362/806 X |
| 4,097,917 | 6/1978 | McCaslin . |
| 4,133,124 | 1/1979 | Chang et al. .................... 362/811 X |
| 4,214,238 | 7/1980 | Adams et al. .................... 340/690 |
| 4,250,537 | 2/1981 | Roegner et al. . |
| 4,345,395 | 8/1982 | Grassi .............................. 362/811 X |
| 4,390,928 | 6/1983 | Runge . |
| 4,556,299 | 12/1985 | Silver . |
| 4,565,010 | 1/1986 | Herman .......................... 340/689 X |
| 4,812,654 | 3/1989 | Araujo ............................. 33/366 X |
| 4,847,739 | 7/1989 | Saraceni ........................ 362/811 X |
| 4,854,214 | 8/1989 | Lowe ............................... 362/253 X |

*Primary Examiner*—Herbert Goldstein
*Assistant Examiner*—Thomas J. Mullen, Jr.
*Attorney, Agent, or Firm*—Dennison, Meserole, Pollack & Scheiner

[57] ABSTRACT

A combined earthquake sensor and night light having a base with a bottom portion resting on a support surface subject to vibrations. A top portion of the base is provided with a reflective surface and a centrally mounted lamp. A transparent cylinder is mounted on the base member to suspend a multifaceted spherical crystal above the light source by means of an elastic helical spring to enable the spherical crystal to move in all directions. Vibrations generated by an earthquake are transmitted to the base member causing movement of the crystal giving a visual indication of the vibrations by light reflection and diffractio. In the static mode the unit serves as a decorative lamp.

8 Claims, 2 Drawing Sheets

COMBINED EARTHQUAKE SENSOR AND NIGHT LIGHT

BACKGROUND OF THE INVENTION

This invention relates to a combined earthquake sensor and night light of durable construction, low cost, and pleasing appearance which can serve as a visual aid in determining the occurrence of an earthquake or aftershock. The onset of an earthquake is usually quite sudden. Depending upon the distance between the particular location and the epicenter, only seconds elapse between the initial tremors and the arrival of the main shock. On the other end of the scale, there are various conditions, both real and imagined, which can trigger off the feelings of experiencing a minor earthquake when in fact none has occurred.

A number of early warning systems have been invented to signal the onset of an earthquake. Some are quite elaborate and involve placing sensors over a wide geographic area and linking them by radio with a central station. Others employ motion sensors based on a suspended magnet inducing a current in a coil or a suspended pendulum interrupting a beam of light. U.S. Pat. No. 3,091,972, issued Jun. 4, 1963 to Johnston, shows an elastically supported pendulum which interrupts a beam of light acting on a light sensitive transducer. U.S. Pat. No. 4,250,537, issued Feb. 10, 1981 to George P. Roegner et al, shows a mirrored globe suspended by a flexible support and illuminated by a source of light. Vibrations cause movement of the globe to reflect the light in different patterns.

A second desideratum of the invention is the design of a durable night light which can be placed on location in a living space to identify a particular location with sufficient emitted light. A long lasting source of light illuminates a faceted crystal globe to achieve a novel lighting effect.

A number of ornamental light fixtures have been invented as typified by U.S. Pat. No. 3,746,852, issued Jul. 17, 1973 to Mary Louise Beaudin, and U.S. Pat. No. 4,072,855, issued Feb. 7, 1978 to Ludovico Marchese. The patent to Beaudin shows a plurality of hemispherically shaped refracting and reflecting lenses mounted upon wire supports above a source of light. The patent to Marchese shows an upright transparent container filled with a fluid containing a plurality of floating reflective platelets. A source of light beneath the container is reflected by the floating platelets in different patterns.

While the above mentioned patents do teach separate motion sensors and light fixtures, the prior art does not teach a combined earthquake sensor and night light having the simplicity of construction, the reliability, and the ease of operation found in the instant invention.

SUMMARY OF THE INVENTION

The overall object of the present invention is to provide a combined earthquake sensor and night light of a reliable design and low cost which will make it attractive for the mass market.

It is a specific object of the invention to support a multifaceted spherical crystal above a light source for movement in all directions. When the crystal is set into motion, light from the light source is scattered in many directions giving an indication of the presence of external vibrations which may be caused by an earthquake.

It is another object of the invention to suspend a multifaceted spherical crystal above a light source by means of a highly elastic elongated helical spring. This suspension enables the crystal to move in all directions including a bouncing motion, a rotary motion, a pendulous motion or any combination of the three. Vibrations arriving at the sensor from any direction will be sensed and indicated by the light scattering effect of the crystal.

It is another object of the invention to house and suspend a helical spring and spherical crystal in a transparent cylinder which exposes the entire mechanism to view. The transparent cylinder is mounted on a supporting base member in coaxial relationship with the light source. A top transparent cover on the cylinder coaxially supports the helical spring and crystal for movement above the light source.

It is yet another object of the invention to provide a functional night light of pleasing appearance. Light from a light source is scattered in many directions by means of a suspended multifaceted spherical crystal and can be viewed through a transparent housing cylinder. The housing cylinder is provided with a transparent top cover which supports a second smaller multifaceted spherical crystal. Some of the light from the light source is upwardly reflected and focussed by the suspended crystal into the upper smaller crystal to achieve a pleasing lighting effect.

BRIEF DESCRIPTION OF THE DRAWINGS

Referring now to FIGS. 1 and 2 of the drawings, the novel combined earthquake sensor and night light comprise a base member 1 adopted to rest on a support 2 in contact with the building to be monitored. The support may be a table top or a wall shelf. The base member 1 must be mounted on the support 2 in a horizontal upright position. The base member comprises a plastic cylinder 3 having its bottom end closed off by a cork or plastic disk 4 which protects any finished surfaces from being marred. The top of plastic cylinder 3 is closed off by a reflective disk 5 having its upper surface provided with a mirror finish. The reflective disk 5 is recessed below the top of cylinder 3 and is adhesively secured within the cylinder below its top surface.

Figure 1:
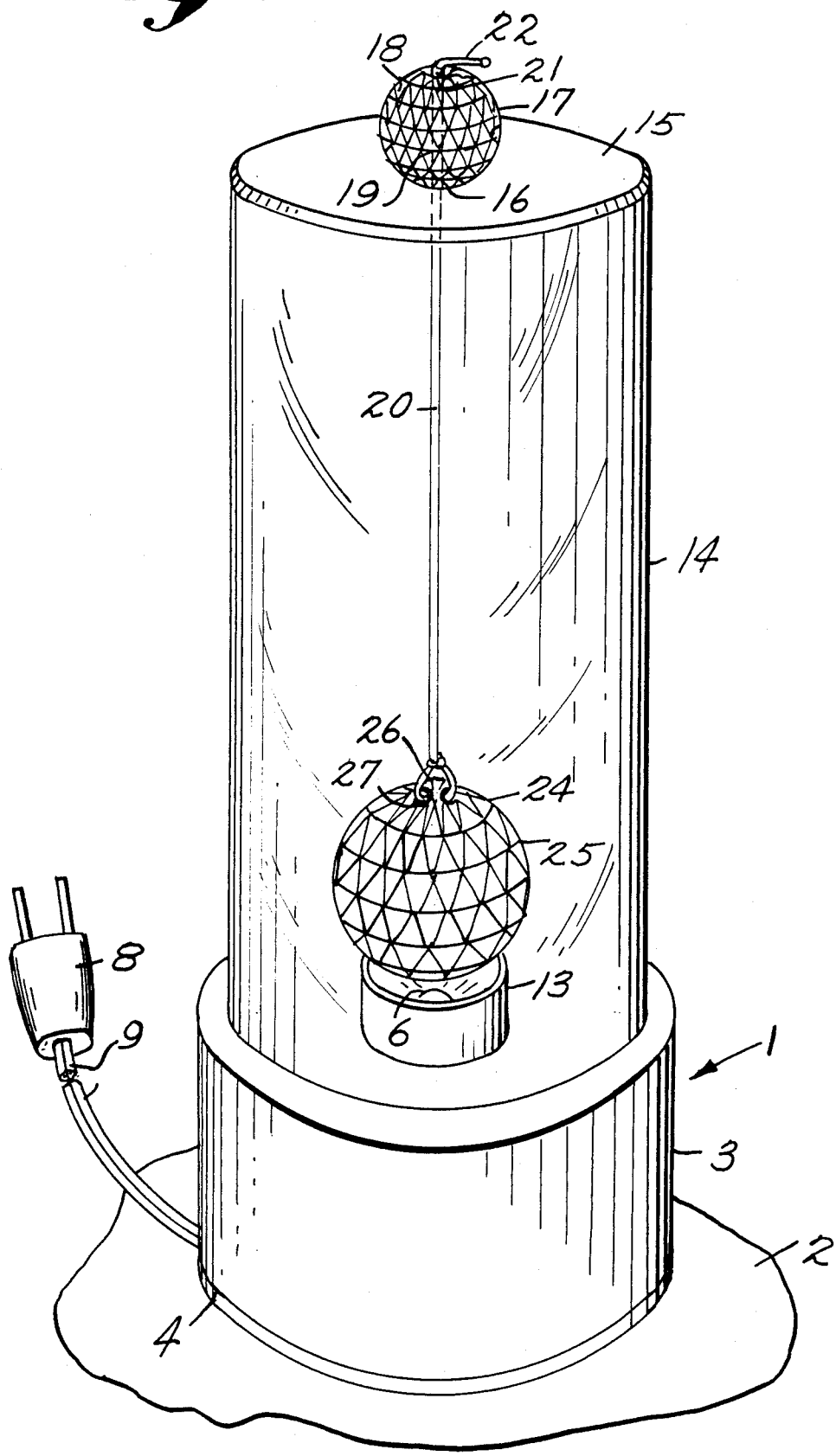
FIG. 1 is a perspective view of a combined earthquake sensor and night light according to the present invention.

A lamp 6 is centrally mounted on reflective disk 5 in a hole 7 to project above the disk and illuminate its surface. While any light source of durable construction and long life can be used, a gas charged tube is shown here connected to a conventional 120 volt AC supply by means of pin plug 8 attached to wires 9 passing through hole 10 in cylinder 3 and electrically connected to leads 11 extending from the lamp 6. A locking device 12 threaded on lamp 6 acts on an opposed surface of reflecting disk 5 to secure the lamp in hole 7 when tightened. A collimating cylinder 13 is mounted on reflective disk 5 around lamp 6 to direct the emitted light in a generally upward direction.

Although a conventional 120 volt AC power supply is shown, it is within the scope of this invention to employ rechargeable batteries as a main power supply or as a standby source of power in case of failure of the house power supply.

A transparent cylinder 14 is mounted internally of plastic cylinder 3 and rests on reflective disk 5 in the recess provided at the top of the plastic cylinder. The transparent cylinder 14 fits snugly within plastic cylinder 3, but is removable to gain access to the internal parts.

The top of cylinder 14 is closed off by means of a transparent cover 15 which is adhesively bonded to the cylinder. Alternatively, the cover 15 and cylinder 14 may be integrally molded in one piece. A hole 16 is provided in cover 15 at a central location.

A spherical crystal 17 having multiple facets 18 is mounted on cover 15 above hole 16. A hole 19 is drilled in crystal 17 and is aligned with hole 16.

An elongated resilient helical spring 20 is suspended from top cover 15 in alignment with holes 16 and 19. The top end of the coils of helical spring 20 are straightened out as at 21 and threaded through the holes 16 and 17 and bent over at 22. The helical spring 20 is thus suspended to generally lie along the axis of symmetry 23 of cylinder 14, cover 15, and base 1.

A second larger spherical crystal 24 having multiple facets 25 is suspended from the bottom of helical spring 20 to lie above lamp 6 and collimating cylinder 13. The spherical crystal 24 is suspended from helical spring 20 by means of a loop 26 passing through hole 27 in the crystal and hooked onto the lower coils of the helical spring.

Figure 2:
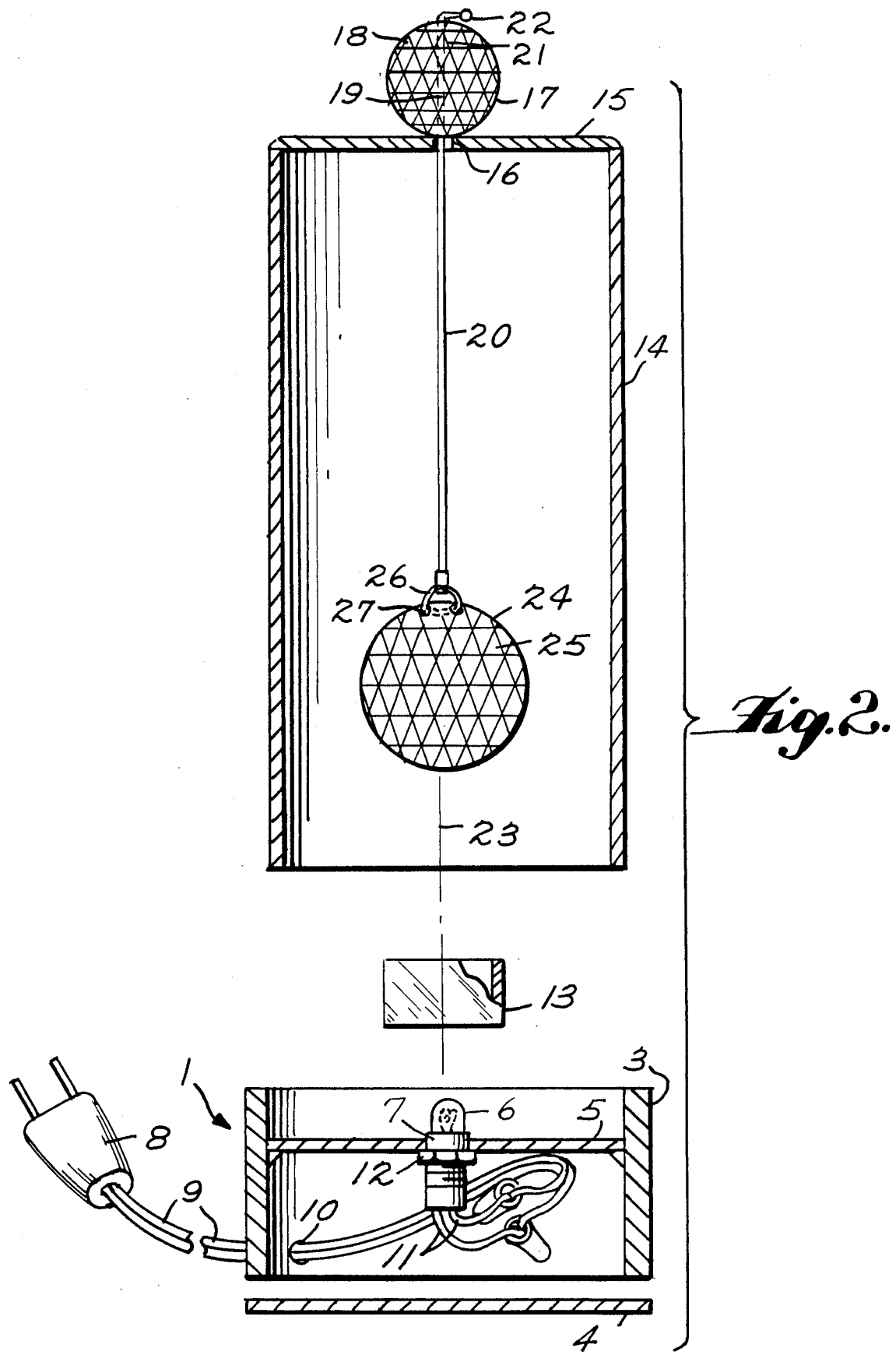
FIG. 2 is an exploded view showing the various parts of the invention in greater detail.

It can be seen from FIGS. 1 and 2 that the major components are symmetrically arranged around axis 23. Although the base 1 and cylinder 14 are shown in the preferred mode as circular, it should be understood that other shapes such as square or triangular may also be employed.

OPERATION

The movements of spherical crystal 24 can be resolved into three basic motions: (1) an up and down bouncing motion, (2) a linear and rotary pendulous motion, and (3) a twisting back and forth motion around the axis of the spring. The design of spring 20 is optimized against the weight and shape of crystal 24 to achieve best sensitivity. Vibrations generated by an earthquake entering base 1 from support 2 will result in relative movement between the base and crystal setting the crystal in motion. The sensor has no dead spots and is responsive to vibrations coming in from all directions. The crystal movement will respond accordingly.

Movement of the crystal 24 is visually enhanced by the light upwardly directed into the crystal by lamp 6 and collimating cylinder 13. The light will be scattered by reflection, diffraction and diffusion by the multifaceted spherical crystal as it moves across the upwardly directed light beam. During an earthquake, the bouncing and gyrating motion of the illuminated crystal will be much greater than the background vibrations normally encountered in a living space and thereby serves as an indication of an earthquake.

In the static mode of operation the earthquake sensor serves as a functional and attractive night light. The spherical crystal 24 is illuminated by lamp 6 and directs light in many directions. Some of the light is focussed on the opposite side of spherical crystal 24 and upwardly directed to illuminate smaller crystal 17. Another portion of the light is reflected back onto reflective disk 5 and upwardly scattered.

It is not intended to limit the present invention to the details of illustration or terms of description of the single preferred embodiment shown above. It will be appreciated by those skilled in the art that various modifications and alterations therein may be made within the scope of the present invention.

What is claimed is:

1. In a combined earthquake sensor and night light comprising a base member having a top and bottom, said bottom adapted to rest on a support surface, said top having a light reflective surface, a light source centrally mounted on said top reflective surface, a transparent cylinder mounted on said top base member in coaxial relationship with said light source, an elongated elastic member coaxially suspended at one end from a support means attached to a top portion of said transparent cylinder, and a light scattering means freely suspended from the other end of said elongated elastic member to lie above said light source whereby vibrations transmitted to said base member from said support surface cause relative movement of said light scattering means giving a visual indication of said vibrations.

2. The combination of claim 1 wherein said light scattering means comprises a spherical crystal having a multifaceted surface.

3. The combination of claim 1 wherein a light collimating cylinder is mounted around said light source to direct the emitted light at said light scattering means.

4. The combination of claim 1 wherein said elongated elastic member comprises a helical spring.

5. The combination of claim 1 wherein said support means attached to a top portion of said transparent cylinder comprises a transparent cover for said transparent cylinder.

6. The combination of claim 5 including a coaxial hole provided in said transparent cover, a second light scattering means mounted on said transparent cover above said hole, said elongated elastic member extending through said hole and being secured to said second light scattering means.

7. The combination of claim 1 wherein said base member and transparent cylinder are circular in shape.

8. In a combined earthquake sensor and night light comprising a circular base member having a top and bottom, said bottom adapted to rest on a support surface, said top having a light reflective surface, a light source centrally mounted on said top reflective surface, a transparent circular cylinder mounted on said top base member above said reflective surface in coaxial relationship with said light source, a light collimating cylinder mounted on said reflective surface to surround said light source, a first spherical crystal having a multifaceted surface mounted above said light source for movement in all directions, means for mounting said movable crystal comprising a transparent cover for said transparent circular cylinder, said cover having a coaxial hole, an elongated helical spring extending through said hole and secured at one end to a second multifaceted spherical crystal mounted on said cover above said hole, the other end of said helical spring being secured to said first movable crystal whereby vibrations transmitted to said base member from said support surface cause relative movement of said first movable crystal giving a visual indication of said vibrations.

* * * * *